United States Patent
Rivera et al.

(10) Patent No.: US 8,279,588 B2
(45) Date of Patent: Oct. 2, 2012

(54) SELF CAPTURING AND KEYED MOBILE DEVICE BUTTON

(75) Inventors: Felix Jose Alvarez Rivera, San Jose, CA (US); Wey-Jiun Lin, Los Altos Hills, CA (US); Emery Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 12/859,674

(22) Filed: Aug. 19, 2010

(65) Prior Publication Data
US 2012/0044623 A1 Feb. 23, 2012

(51) Int. Cl.
*G06F 1/16* (2006.01)
(52) U.S. Cl. ............. 361/679.02; 200/568; 70/237; 455/575.3; 224/328
(58) Field of Classification Search .......... 224/328, 224/539; 361/679.01, 679.57, 679.43, 679.03, 361/679.08, 679.38, 679.2; 200/61.54, 43.13, 200/33 R, 568; 16/303, 330, 232, 297; 70/25, 70/16, 134, 237, 156, 186; 455/575.1, 74, 455/173.1, 575.3
See application file for complete search history.

(56) References Cited

U.S. PATENT DOCUMENTS

| | | | |
|---|---|---|---|
| 6,872,899 B2 * | 3/2005 | Oshio et al. | 200/43.13 |
| 7,314,320 B2 * | 1/2008 | Nakamura | 396/420 |
| 7,480,132 B2 | 1/2009 | Wu et al. | |
| 7,642,477 B2 | 1/2010 | Peng et al. | |
| 2007/0205090 A1 | 9/2007 | Chen | |
| 2008/0037202 A1 * | 2/2008 | Shinohara et al. | 361/679 |
| 2009/0159411 A1 | 6/2009 | Guo et al. | |
| 2010/0060568 A1 | 3/2010 | Fisher et al. | |
| 2010/0092847 A1 | 4/2010 | Li | |

\* cited by examiner

*Primary Examiner* — Hung Duong
(74) *Attorney, Agent, or Firm* — Kramer Levin Naftalis & Frankel LLP (57) ABSTRACT

A housing of an electronic device encloses and supports at least one operational component and includes at least one opening sized to accommodate a mechanical input assembly. The mechanical input assembly includes a feature arranged to receive an input event, at least a portion of the feature exposed at an outside surface of the housing, an operational indicia visible on the exposed portion and having a preferred orientation with respect to the housing, the operational indicial providing an indication of how an operation of the operational component is influenced, and a shaft having a size and shape in accordance with the opening, the shaft attached to the external feature at a first end and an integrally formed self-capturing feature at the second end. The self-capturing feature is inserted into the opening until activated. The indicia is then properly aligned and the mechanical input assembly is locked to the housing.

25 Claims, 12 Drawing Sheets

SELF CAPTURING AND KEYED MOBILE DEVICE BUTTON

BACKGROUND

1. Field of the Invention

The invention relates to consumer products, and more particularly, methods and apparatus for securing a button to a housing while retaining a desired orientation for the button.

2. Description of the Related Art

Consumer products generally require mechanisms that assist a user in providing internal operational components instructions. Examples of such mechanisms include buttons, sliders, and keyboards. Small form factor consumer electronic products, such as portable media players and the like, have small enclosures that leave little room for expansive mechanical inputs. Additionally, in some cases, the mechanical inputs include external features, such as symbols indicating their function, that must retain a specific orientation.

Therefore, what is needed is a solution for securing a button to a housing while retaining a desired orientation for the button.

SUMMARY

Broadly speaking, the embodiments described herein describe a button assembly and housing well suited to allow for easy installation of the button assembly into the housing and locking of the orientation of the button assembly.

A method for assembling an electronic device having a housing is provided. The housing is arranged to enclose and support at least one operational component and includes at least one opening sized to accommodate a mechanical input assembly, the mechanical input assembly used to influence operations of the operational component. The provided mechanical input assembly includes a feature arranged to receive an input event, at least a portion of the feature exposed at an outside surface of the housing. The mechanical input assembly also includes an operational indicia visible on the exposed portion of the feature and having a preferred orientation with respect to the housing, the operational indicial providing an indication of how the operation of the operational component is influenced. The mechanical input assembly also includes a shaft having a size and shape in accordance with the opening, the shaft is attached to the external feature at a first end and an integrally formed self-capturing feature at the second end. The self-capturing feature is inserted into the opening until the self-capturing feature is activated. The indicia is then properly aligned. The orientation of the mechanical input assembly can then be locked to the housing.

Additionally, a method for installing and aligning a button assembly to a housing is described. In the described embodiment, the button assembly includes at least a button feature attached to a shaft having a self-capturing feature. The shaft of the button assembly is inserted into an opening in the housing, until the self-capturing feature passes through the entire opening. This acts to secure the button assembly to the housing so that the button assembly cannot be removed, as the self-capturing feature is designed to capture the button feature to the housing once the self-capturing feature passes completely through the opening. In one embodiment, this self-capturing feature is a threaded portion designed to engage a corresponding threaded portion on the opening of the housing. In another embodiment, the self-capturing feature is an expanding fastener that is designed to be compressed upon insertion of the shaft into the opening and then expand once the fastener emerges from the other end of the opening.

The button assembly is then rotated until a surface feature of the button feature matches a desired orientation. The orientation of the button assembly is then locked by engaging an alignment feature to lock the button assembly to the housing. In one embodiment, the alignment feature is a notch on the button feature designed to engage a tabbed portion of the housing when the button assembly is at a particular orientation.

A computing device is described, having a housing and a button assembly. The housing is arranged with an opening and a first keying feature. The button assembly includes a button feature with a surface feature and a second keying feature, and a shaft containing a self-capturing feature designed to secure the button assembly to the housing when the shaft is passed through the entire opening. The second keying feature is designed to engage the first keying feature to lock the orientation of the button assembly to prevent further rotation, once the button assembly is rotated to a desired orientation.

A computer readable medium is described for storing, in non-transitory tangible form, computer instructions executable by a processor for installing and aligning a button assembly to a housing. This computer readable medium can include computer code for inserting the shaft of the button assembly into an opening in the housing until the self-capturing feature passes through the entire opening, thus securing the button assembly to the housing, computer code for rotating the button assembly until the surface feature matches a desired orientation, and computer code for locking the orientation of the button assembly by engaging an alignment feature to lock the button assembly to the housing.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Broadly speaking, the embodiments disclosed herein describe a mechanical input assembly having both a self-capturing feature and an alignment feature well suited for use with a small form factor electronic device. The self-capturing feature secures the mechanical input assembly to a housing once the self-capturing feature is passed through an opening in a housing. The aligning feature locks the mechanical input assembly at a particular desired orientation. In this manner, a mechanical input assembly having surface features where a particular orientation is desired can be efficiently accommodated.

In the described embodiments, the mechanical input assembly can take the form of a mechanical button assembly. The mechanical button assembly can include a shaft having the self-capturing feature at one end, and a surface feature on the other end. The self-capturing feature itself can take many forms, including, for example, threads designed to be screwed into corresponding threads on the housing, and an expanding fastener designed to compress as it passes through the opening in the housing and expand once it reaches the other end of the opening. The self-capturing feature secures the mechanical input assembly to the housing, acting to block its removal from the housing.

The mechanical input assembly can then be rotated until the surface feature matches a desired orientation. The orientation of the button assembly can then be locked by engaging an alignment feature to lock the mechanical assembly to the housing. This alignment feature may take the form of, for example, a key (such as a notch) located on the mechanical input assembly and designed to engage a corresponding tabbed portion of the housing. In this manner, the mechanical input assembly can be both secured to the housing and locked in a particular orientation in an efficient manner.

Figure 1:
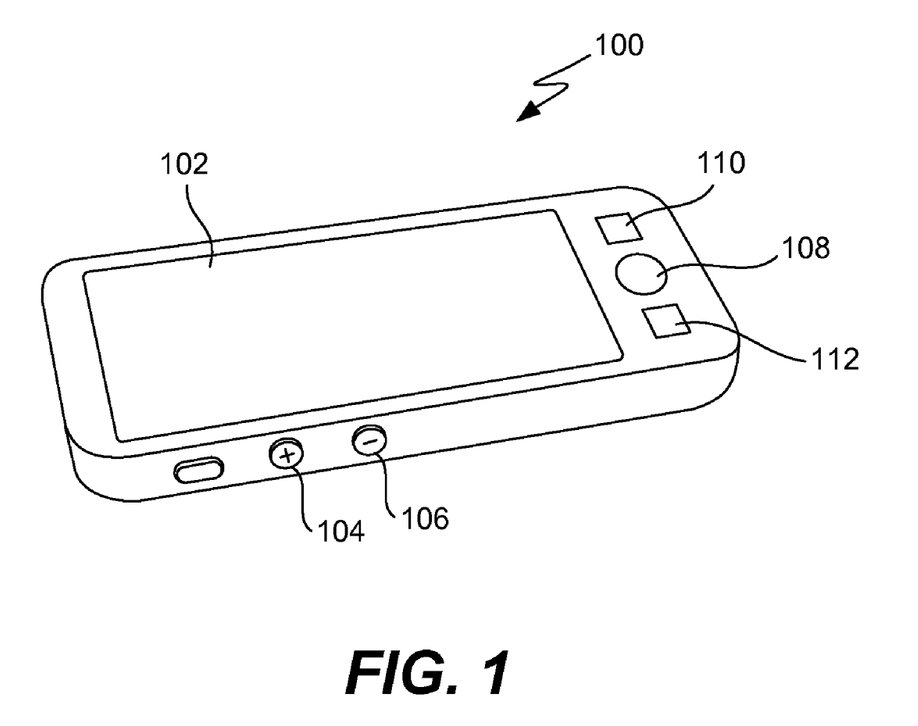
FIG. 1 is a diagram illustrating representative consumer product in accordance with the described embodiments.

FIG. 1 is a diagram illustrating representative consumer product 100 in accordance with the described embodiments. Consumer product 100 can take many forms, not the least of which includes a portable media player such as an iPod™ smartphone such as an iPhone™, and a tablet computer such as an iPad™, each manufactured by Apple Inc. of Cupertino, Calif. Consumer product 100 can have any number of features that can be used to receive user inputs to, for example, control or influence operations of consumer product 100. For example, consumer product 100 can include touch sensitive display 102 configured to present virtual control features as visual content that can assist a user in controlling selected functions performed by consumer product 100. For example, a graphical user interface having various icons can be presented, each of which can be used to control or at least influence selected functions. In addition to virtual control features, various mechanical control features such as mechanical inputs 104-112 can be used to provide additional control features.

Mechanical inputs 104-112 can take many forms such as a button, slider, toggle switch, and so on. For the remainder of this discussion, however, mechanical inputs 104-112 take the form of depressible buttons. However, unlike the virtual control features presented by display 102, buttons may have mechanical input features that must be visually aligned. In some instances, the buttons 104-112 may be rotated during use, either intentionally or unintentionally. For example, round buttons 104 and 106 can be rotated within the opening of the housing. This can create a problem if the surface indicia are such that misalignment is visually obvious. There is tremendous aesthetic appeal to properly aligned surface features, and when surface features of a consumer product appear misaligned, it can convey the impression that the product is not well constructed or is otherwise of low quality. Conversely, when surface features are all precisely properly aligned, the aesthetic appeal of the product is greatly improved and it imparts an impression of a well designed, well constructed, and otherwise high quality product.

In addition to the aesthetic improvements from properly aligned surface features, misaligned surface features can result in the user misunderstanding the function of the input assembly. For example, if the surface feature is an "o", then rotation of the button does not change the appearance of the surface feature. However, if the surface feature is a "+," as in button 104, then rotation of the button appears may change the surface feature to an "x." This could confuse a user into believing the button performs one function when it actually performs a different function. Of course, the problem extends beyond merely round buttons, and in fact any shaped button (e.g., square, rectangular, triangular, etc.) can encounter this problem if it can be rotated and its surface indicia is such that a particular orientation is required.

Broadly speaking, the embodiments disclosed herein describe a mechanical input assembly having a self-capturing feature, designed to secure the mechanical input assembly to a housing, as well as an alignment feature, designed to lock the mechanical input assembly at a desired orientation. There are various possible embodiments of the self-capturing feature. Examples of these embodiments are hereby provided. One of ordinary skill in the art, however, will recognize that there are additional possible embodiments not explicitly described, and the claims shall be construed broadly to encompass any of these additional embodiments, unless expressly specified.

At the most basic level, the self-capturing feature is designed to block the removal of the button assembly from the housing once the self-capturing feature is engaged. In this way, the self-capturing feature is acting to prevent movement of the button assembly back out of the housing once it has been completely inserted. It is not necessary for the self-capturing feature to prevent movement of the button assembly in any other direction. In fact, movement of the button assembly, at least to a certain extent, in the opposite direction (i.e., pushing the button "in" through the housing) is likely necessary to allow the range of movement for the button to be "pressed" during use to activate whatever features the button represents. Likewise, it is not necessary for the self-capturing feature to prevent rotation of the button feature along the axis parallel to the shaft, as that rotation will be locked by the alignment feature, described later. Additionally, it is not necessary for the self-capturing feature to prevent lateral movement of the button feature, as that function can be performed by the opening in the housing itself, which can be designed to be only slightly larger than the button feature so as to prevent significant lateral movement, or through the use of a gasket, described later. The self-capturing feature need only prevent the button feature from being removed from the opening of the housing.

Figure 2:
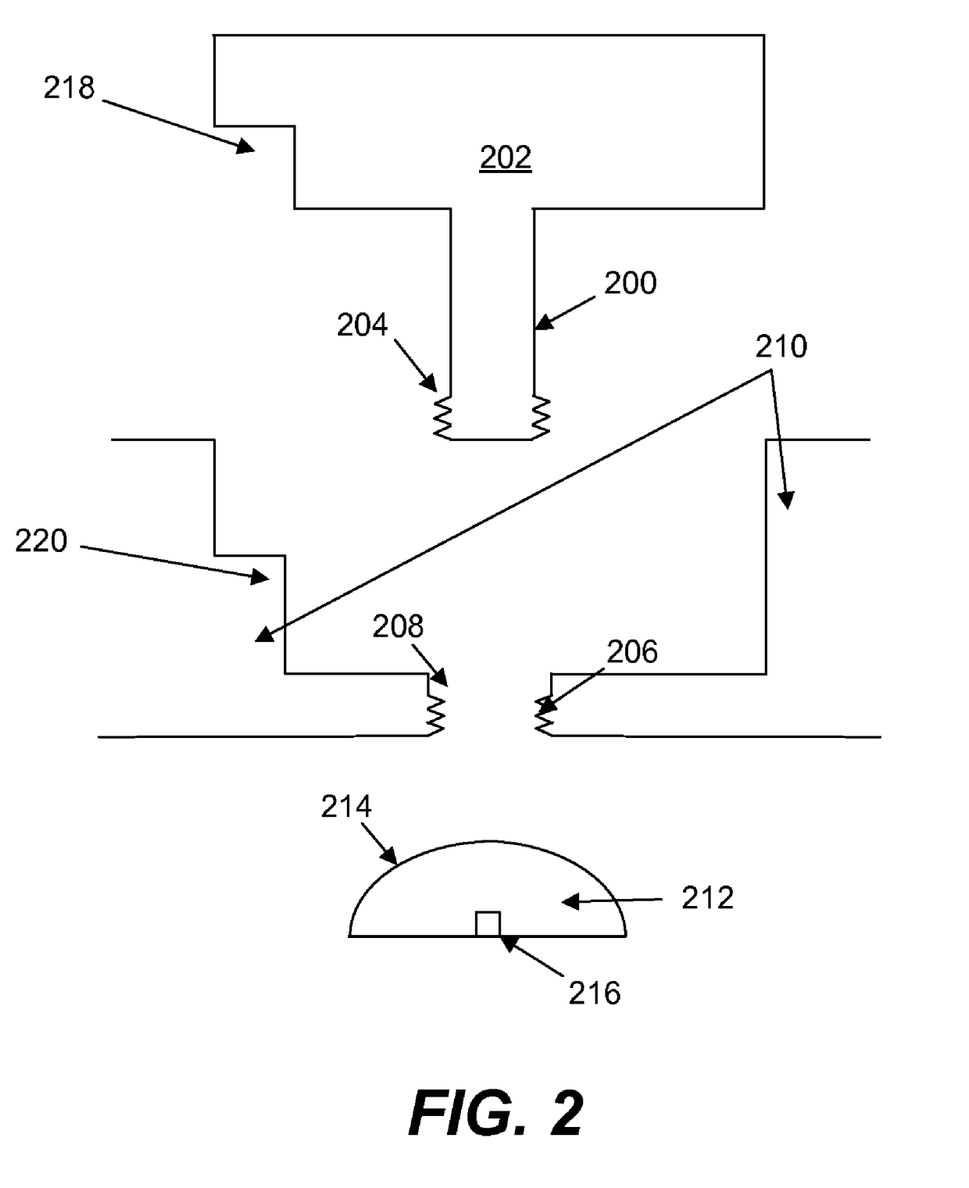
FIGS. 2, 3, and 4 are diagrams illustrating a button assembly in accordance with some of the described embodiments.
Figure 3:
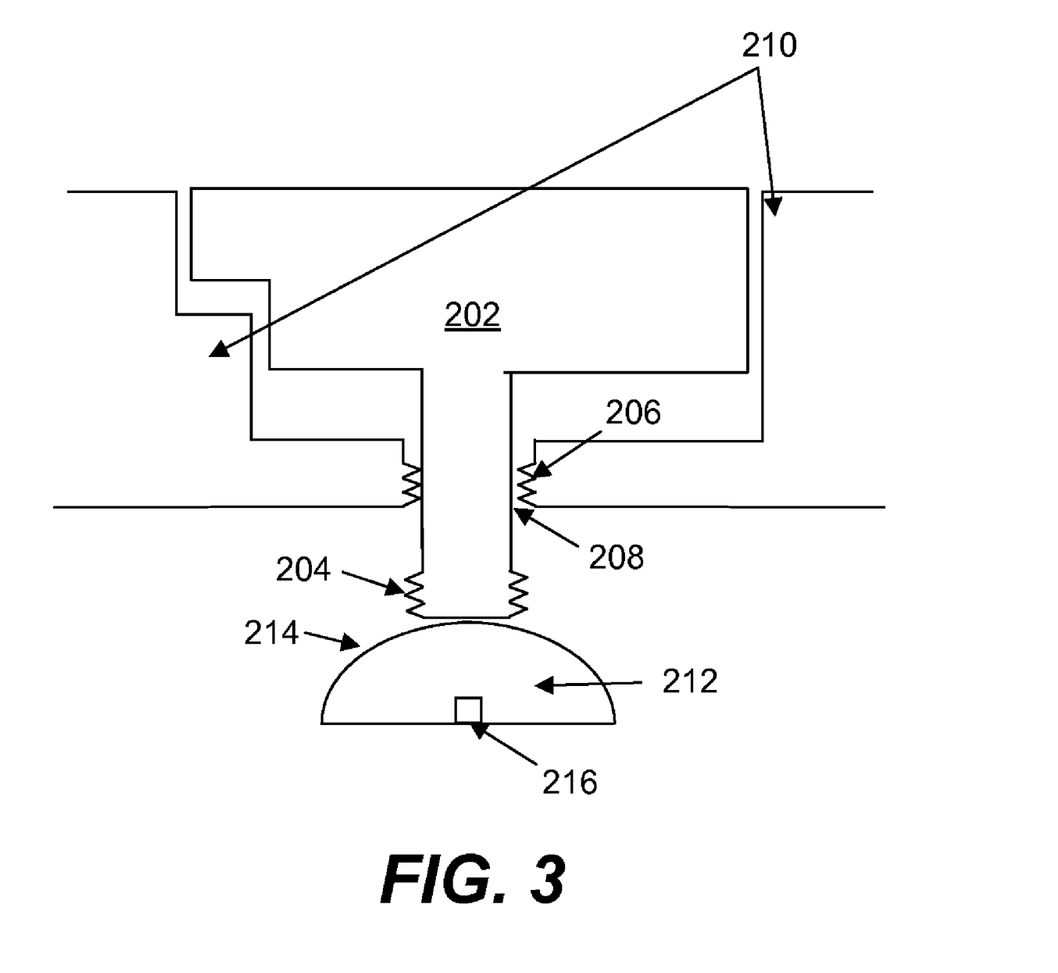
Figure 4:
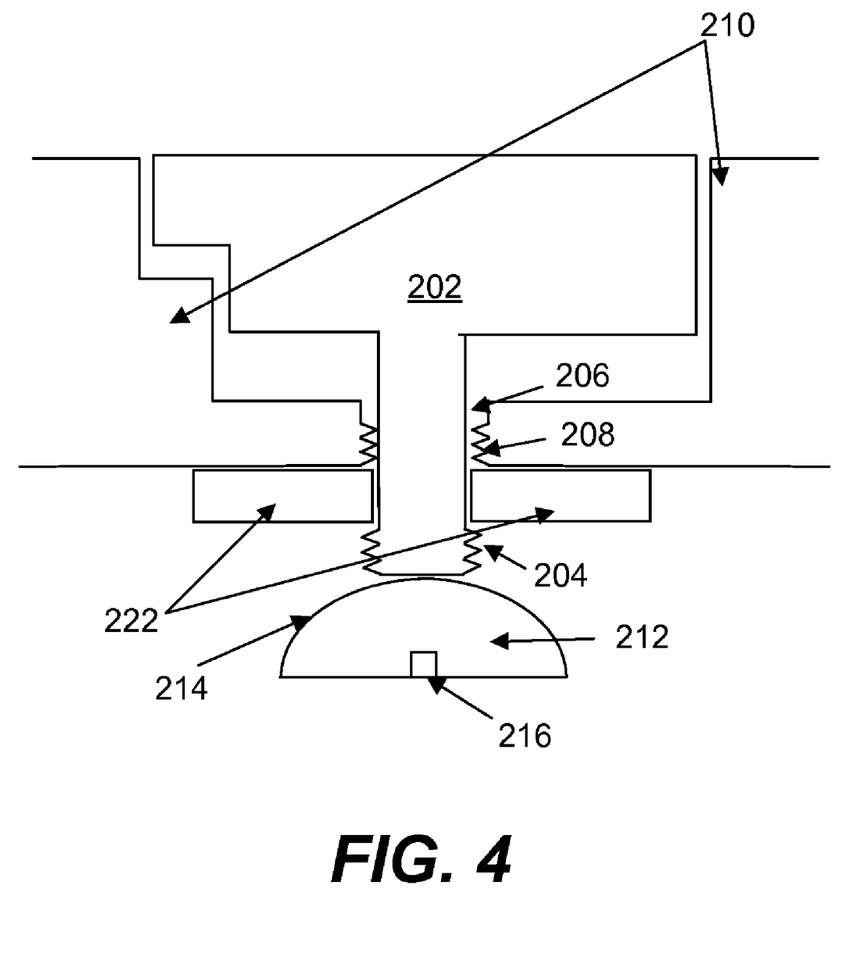

FIGS. 2, 3, and 4 are diagrams illustrating one embodiment of the button assembly. Referring to FIG. 2, shaft 200 of button assembly 202 includes a series of threads 204. Threads 204 are designed to engage a conforming threaded portion 206 of opening 208 of housing 210. The number of threads 204 on shaft 200 does not need to be significant. In one embodiment, two or three threads will suffice. A switch assembly 212 is also provided, here depicted in the form of a dome membrane 214 and contact 216. Button assembly 202 is secured to housing 210 by inserting shaft 200 into opening 208 until the threads reach the top of conforming threaded portion 206 of opening 208. Button assembly 202 is then rotated so that threads 204 engage threaded portion 206 of opening 208. This rotation continues until threads 204 pass through all of threaded portion 206 of opening 208 and completely emerge on the interior side of the opening 208. Additionally, key 218 is provided on button assembly 200, which conforms to a corresponding tabbed portion 220 of housing 210. The purpose of key 218 and tabbed portion 220 are to prevent rotation of button assembly 202. This will be described in more detail later.

FIG. 3 depicts the embodiment of FIG. 2 after threads 204 of button assembly 202 have been inserted past all of threaded portion 206 of opening 208. At that point, threads 204 may act to prevent movement of button assembly 202 back out of opening 208. There may be a variety of different mechanisms used to aid in this blocking of movement. Threads 204 themselves can act as a certain barrier to pulling button assembly 202 back out of housing 210, in that threads 204 may be such that simply pulling, without performing a rotation (i.e., unscrewing) would not be enough to remove button assembly 202 from housing 210. That action, however, may result in repeated stress on the threads, possibly damaging them to the point where pulling the button assembly out of the housing is possible. Additionally, the user may inadvertently unscrew button assembly 202 if the button is rotated. Therefore, in one embodiment, a shim or shims can be inserted. FIG. 4 depicts the embodiment of FIG. 2 and FIG. 3 after shim(s) 222 have been inserted. Here, shim(s) 222 are inserted between the interior side of housing 210 and the top of threads 204. Shim or shims 222 may be constructed of any of a number of different materials, such as plastic, paper, or metal. The shims act as a barrier between the top of threads 204 of shaft 200 and the interior side of housing 210, both protecting threads 204 and preventing movement of button assembly 202 out of opening 208.

Figure 5:
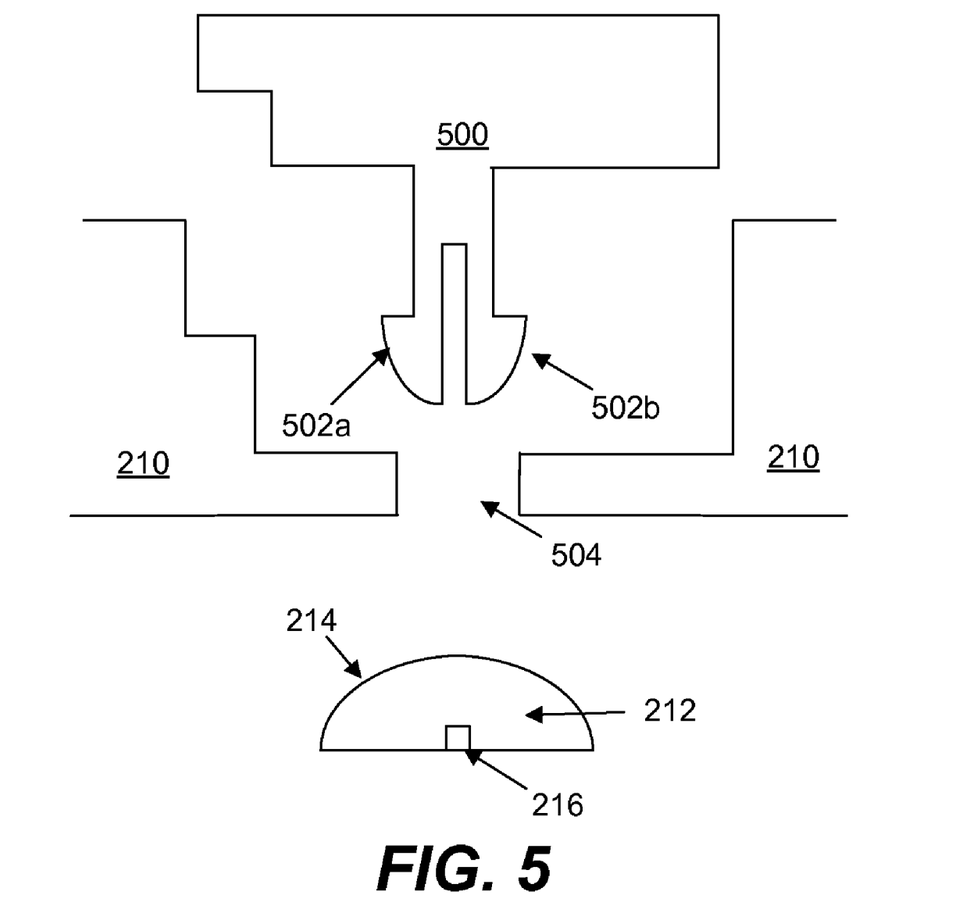
FIGS. 5, 6, and 7 are diagrams illustrating a button assembly in accordance with others of the described embodiments.
Figure 6:
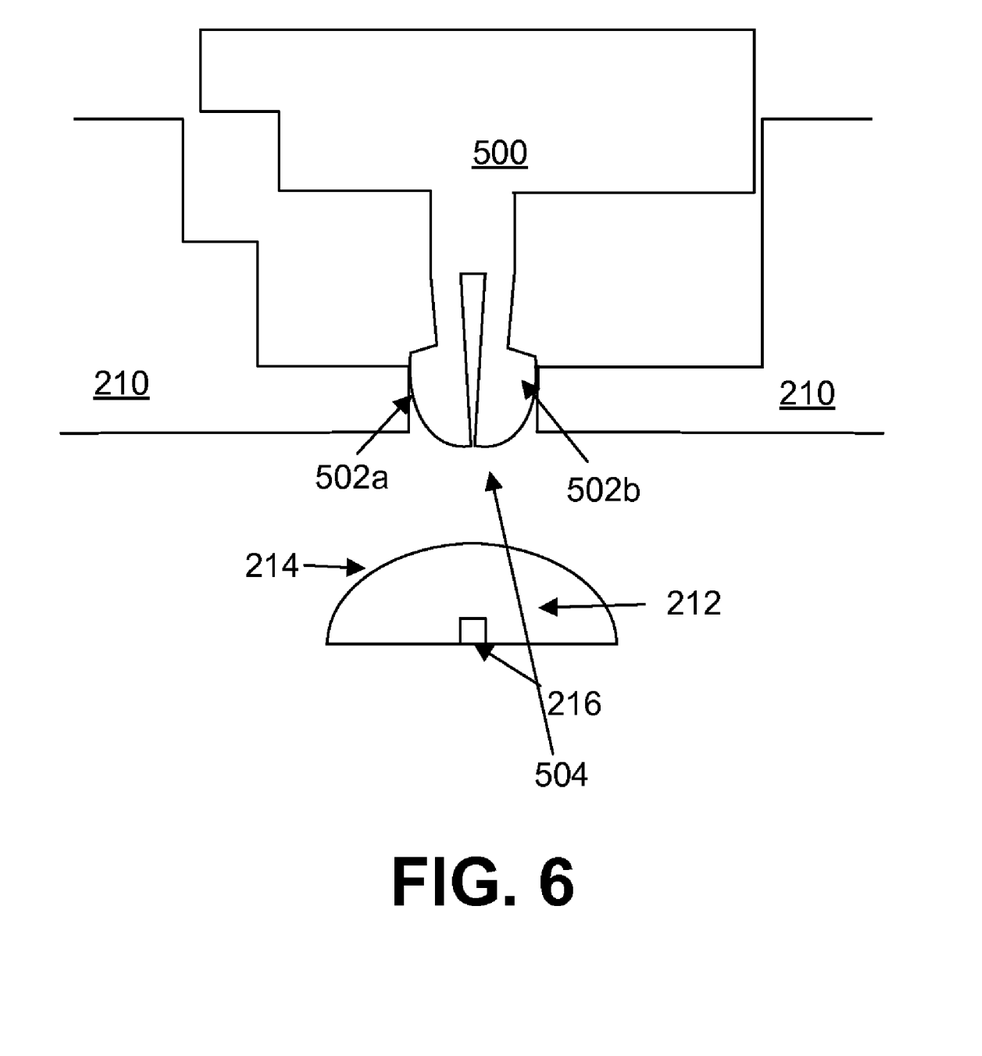
Figure 7:
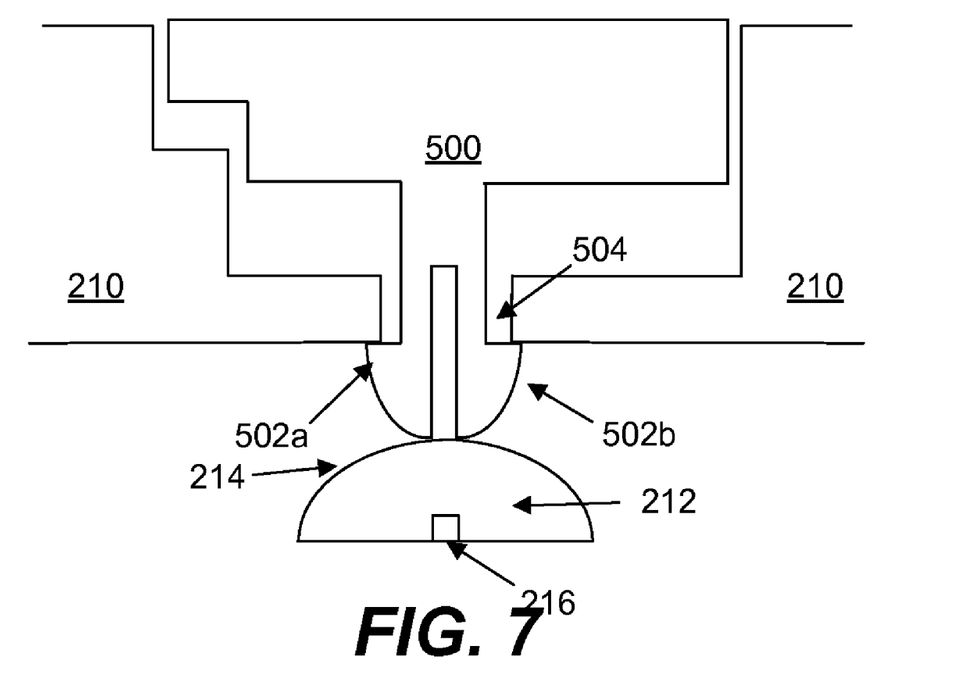

In another embodiment, an expanding fastener is built into the shaft of the button assembly. An example of this is depicted in FIGS. 5, 6, and 7. Button assembly 500 includes expanding fasteners, which may include, for example, one or more prongs 502a, 502b. The prongs, when depressed, contract towards and possibly into the shaft, and when released, expand laterally away from the shaft. The prongs may be depressed by the installer when inserting the shaft into opening 504. While passing the fastener through the opening, the sides of the opening may act to prevent the expansion of the prongs. However, once the prongs pass through to the other side of the opening 504, the prongs expand. The prongs may then act to prevent movement of the button assembly out of the opening.

There are various embodiments of how these prongs may be designed. In one embodiment, the prongs are formed of a molded material that tends to expand to the shape depicted in FIG. 5 when no force is applied. When inserted into opening 504, the prongs 502a, 502b are depressed by the installer in order to fit into opening 504. This is depicted in FIG. 6. FIG. 7 depicts the prongs 502a, 502b as they expand back outward after they have cleared opening 504.

It should be noted that the embodiment shown in FIGS. 5-7 contains a shaft with a diameter that is somewhat less than the size of the opening, which may result in unacceptable lateral movement in some cases. Other embodiments of the expanding fasteners can be utilized which minimize or eliminate this difference between the diameter of the shaft and the size of the opening. Additionally, a gasket may be utilized to reduce the difference in the sizes to eliminate lateral movement.

Figure 8:
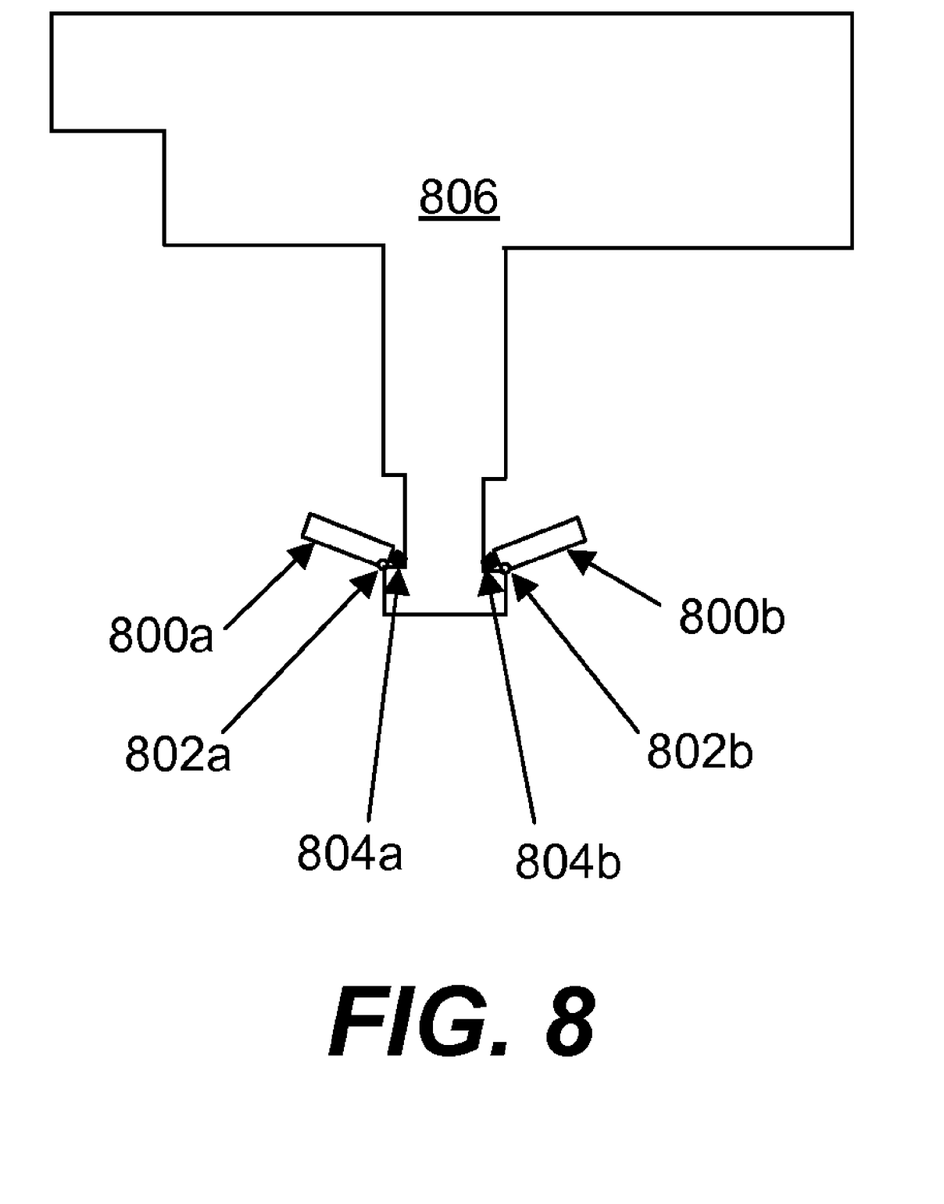
FIG. 8 is a diagram illustrating another embodiment of an expanding fastener.

FIG. 8 depicts another embodiment of an expanding fastener. Here, prongs 800a, 800b are similar to "wings" and each include hinge 802a, 802b on the lower side of the shaft. When prongs 800a, 800b expand, they actually rotate upwards and outwards via force applied from springs 804a, 804b, but hinges 802a, 802b are designed to only allow movement to, at most, a 90 degree angle between the shaft and each prong 800a, 800b. Thus, prongs 800a, 800b essentially lock at a horizontal configuration upon opening, with the hinges 802a, 802b themselves resisting movement beyond about a 90 degree angle and the springs acting to resist movement back towards about a 0 (zero) degree angle that would be necessary to pull button assembly 806 back through the opening.

Figure 9:
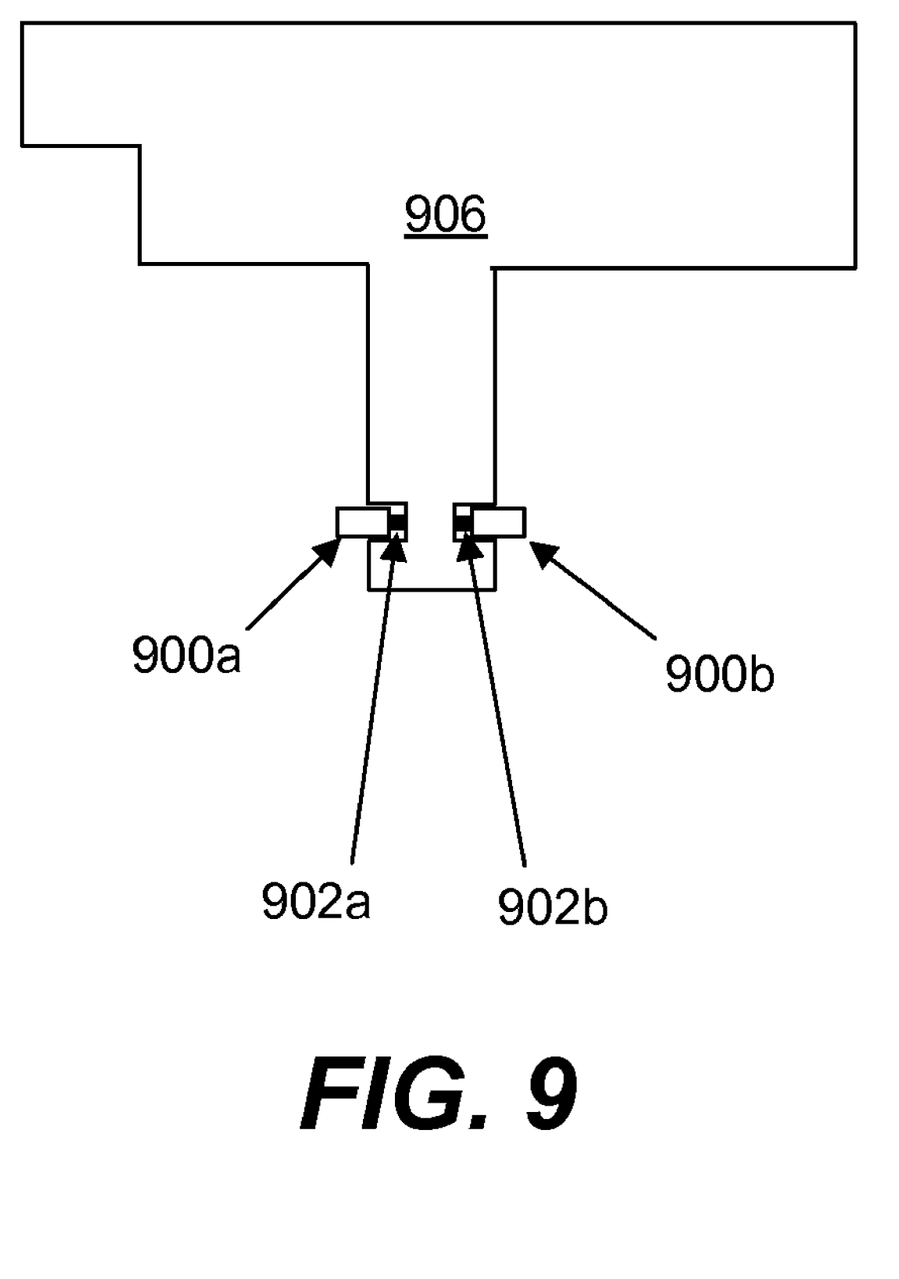
FIG. 9 is a diagram illustrating another embodiment of an expanding fastener.

FIG. 9 depicts another embodiment of an expanding fastener. Here, prongs 900a, 900b are simply designed to move solely in the horizontal direction, and thus simply "pop out" of the shaft when the shaft clears the opening, by virtue of a spring 902a, 902b corresponding to each prong 900a, 900b and resisting movement of each prong 900a, 900b back into the shaft. In this embodiment of the prongs, no hinges are required. Additionally, there are other embodiments for the expanding fastener than merely embodiments involving prongs. At the most basic level, any fastener that acts to move outwards from the shaft upon the shaft emerging from the interior side of the opening can act to secure button assembly 906 to the housing by resisting the button assembly from being pulled out past the opening.

An expanding fastener embodiment has the advantage of not requiring that either the shaft of the button assembly or the opening of the housing contain threads, and also has the advantage of not requiring a rotation movement on the part of the installer during the securing feature. Another advantage is that a shim is not required, therefore the part count is reduced, assembly time and effort is reduced and tighter tolerances between the switch and the button can be achieved. However, in some embodiments it may be desirable to force the installer to rotate the button assembly during the securing. For example, the threads of the shaft of the button assembly and the threads of the opening of the housing may be designed so that immediately upon the threads emerging from the interior surface of the opening of the housing, the orientation of the surface feature of the button is at or near the desired orientation. This may help to reduce assembly time and complexity of subsequent orientation and locking steps because the button assembly is essentially already oriented. Thus, an embodiment is foreseen wherein both threads and an expanding fastener are utilized, eliminating the need for a shim.

Beyond merely securing the button assembly to the housing, another important feature is the rotating and locking of the orientation of the button assembly so that the surface feature matches a desired orientation. The surface feature itself may be constructed in a number of different ways. In one embodiment, the surface feature is etched or carved into the button feature itself. In that manner, the surface feature is essentially an indentation or series of indentations on the button feature. In another embodiment, the surface feature rises above the button feature, formed either as part of the button feature itself during casting or affixed to the top of the button feature after manufacture. In another embodiment, the surface feature sits flush or essentially flush with the surface of the button feature. Examples of such flush surface features include stickers affixed to the button feature and ink applied to the surface of the button feature.

The surface of the button feature itself need not sit completely flush with the exterior surface of the housing. Button assemblies can either protrude out of the housing or be recessed within it. Additionally, some button assemblies may have portions that sit flush with the exterior surface of the housing and other portions that are either recessed or protruding. An example of this is the "home" button on the iPhone™, produced by Apple Inc. of Cupertino, Calif., in which the button surface itself is concave so that it sits flush or nearly flush with the housing at its edges, while being recessed in the middle. Furthermore, buttons that ordinarily may not rotate if fully contained within a corresponding opening of a housing, such as a square button sitting flush in a square opening, may nevertheless rotate if designed not to sit flush, for example if the button is sitting completely above the top opening.

Nevertheless, regardless of the type of surface features and button configurations, the features themselves can be such that there is a desired orientation for the features with respect to the housing. This desired orientation may not match the actual orientation of the surface features after the installer has secured the button assembly to the housing. Furthermore, even if the orientation matches after assembly, the orientation may shift over time and with use (as, for example, the user could accidentally rotate the button by applying surface pressure with a finger and moving in a clockwise or counter-clockwise motion). As such, in an embodiment, an alignment feature is provided to lock the orientation of the button assembly.

Figure 10:
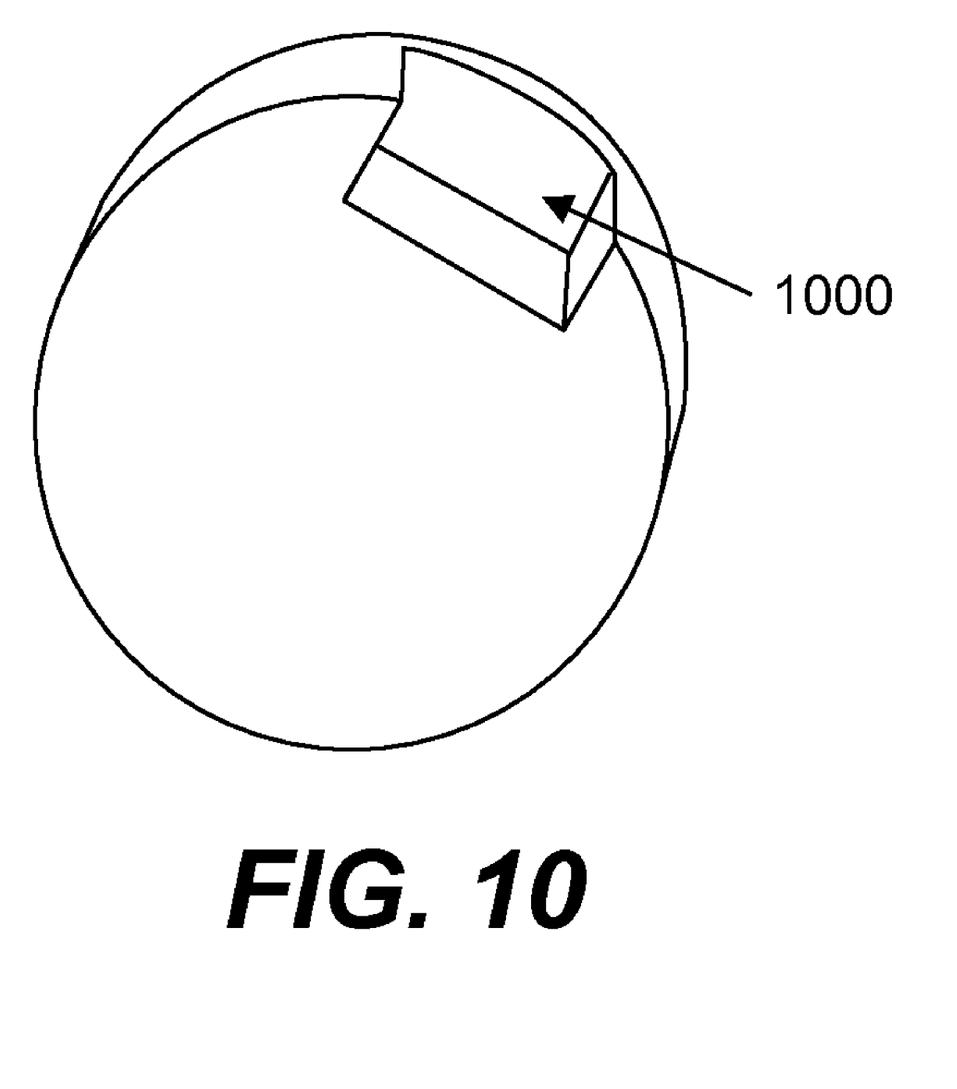
FIG. 10 is a diagram illustrating a bottom view of a button feature in accordance with one of the described embodiments.

In one embodiment, this alignment feature is a key integrated into the button assembly that is designed to engage a corresponding portion of the housing. This key is depicted in FIG. 10, which is a diagram illustrating a bottom view of a button feature. The key in this embodiment is essentially a notch 1000. This key may be located at a particular portion of the side of the button assembly so as to lock the button assembly in a particular orientation. As described earlier, the housing contains a corresponding tabbed portion that is designed to engage the key when the button assembly is at the desired orientation. After securing the button assembly to the housing, the installer may rotate the button assembly to the desired configuration (also known as "clocking" the button). The key then engages the tabbed portion, which then locks the orientation. Of course, the key and tabbed portion is merely one example of a way to lock the orientation of the button assembly. One of ordinary skill in the art will recognize that there are other possible mechanisms that can be used to lock the orientation of the button assembly at a desired orientation.

Figure 11:
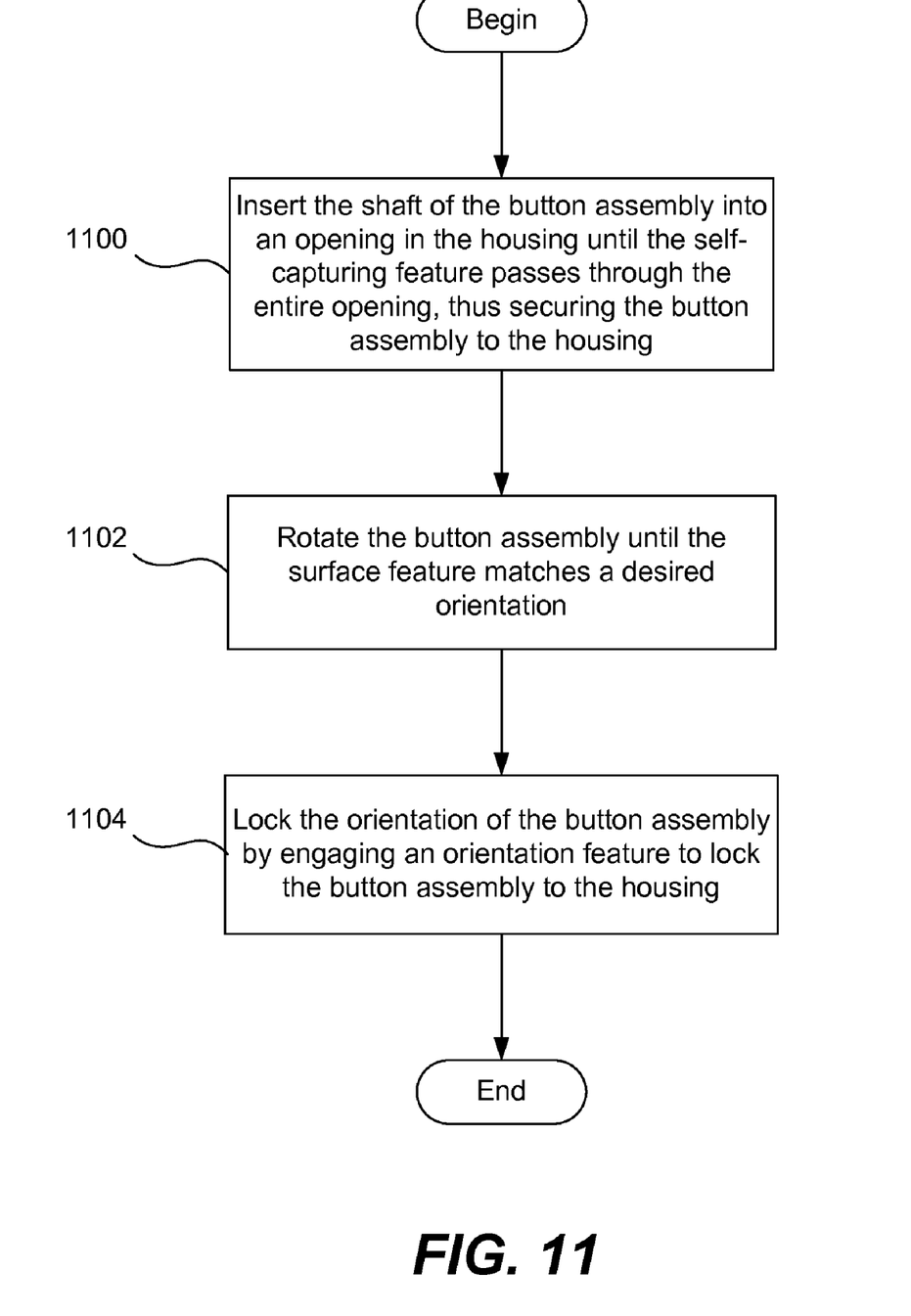
FIG. 11 is a flow diagram illustrating a first embodiment of a method for installing and aligning button assembly to a housing.

FIG. 11 is a flow diagram illustrating a first embodiment of a method for installing and aligning button assembly to a housing. The button assembly includes at least a button feature attached to a shaft having a self-capturing feature wherein the button feature has a surface feature. At 1100, the shaft of the button assembly is inserted into an opening in the housing until the self-capturing feature is activated. The self-capturing feature can take many forms. For example, in one embodiment, the self-capturing feature can take the form of threads machined into a first end of the shaft that can be aligned with corresponding threads machined into an opening in the housing. In another embodiment, the self-capturing feature can take the form of an expanding fastener machined into the shaft that can be compressed as it is passed into the opening in the housing and expands back outwards once it has cleared the opening. Nevertheless, no matter the form of the self-capturing feature, once it has passed through the entire opening, it acts to secure the button assembly to the housing. At 1102, the button assembly is rotated until the surface feature matches a desired orientation. At 1104, the orientation of the button assembly is locked by engaging an alignment feature to lock the button assembly to the housing.

Figure 12:
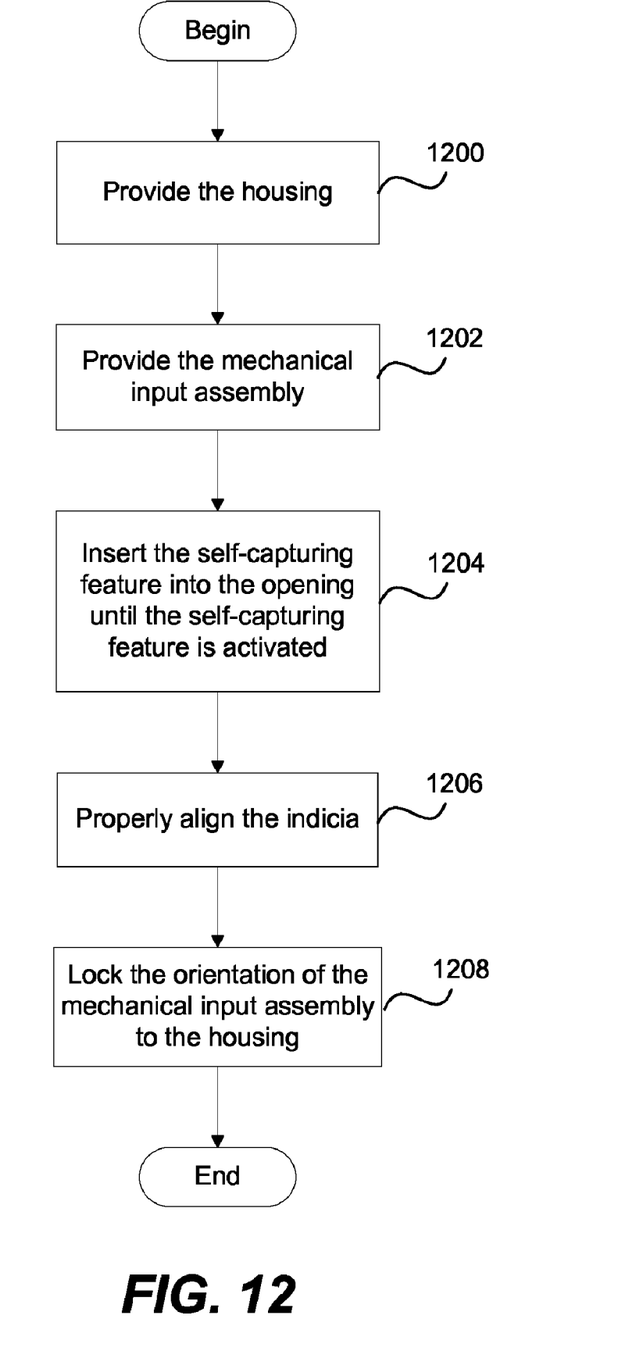
FIG. 12 is a flow diagram illustrating a method for assembling an electronic device having a housing in accordance with one of the described embodiments.

FIG. 12 is a flow diagram illustrating a method for assembling an electronic device having a housing in accordance with one of the described embodiments. The housing is arranged to enclose and support at least one operational component and includes at least one opening sized to accommodate a mechanical input assembly. The mechanical input assembly is used to influence operations of the operational component. At 1200, the housing is provided. At 1202, a mechanical input assembly is provided. The mechanical input assembly includes a feature arranged to receive an input event, wherein at least a portion of the feature is exposed to an outside surface of the housing. The mechanical input assembly also includes an operational indicia visible on the exposed portion of the feature, wherein the operational indicia has a preferred orientation with respect to the housing. The operational indicia provides an indication of how the operation of the operational component is influenced. The mechanical input assembly also includes a shaft having a size and shape in accordance with the opening. The shaft is attached to the external feature at a first end and an integrally formed self-capturing feature at a second end. At 1204, the self-capturing feature is inserted into the opening until the self-capturing feature is activated. At 1206, the indicia is properly aligned. At 1208, the orientation of the mechanical input assembly is locked to the housing.

In another embodiment, a computer-readable medium is provided that includes computer program instructions for performing the various steps of installation of the button assembly. Specifically, the computer program instruction may act to control various automatic installation components, such as, for example, robotic arms, automatic screwdrivers, etc. that can assemble the device without the need for human intervention (or, at least, minimizing human intervention). In this way, the computer instructions may be programmed to control a machine to insert the shaft of the button assembly into an opening until a self-capturing feature passes through the entire opening, then rotate the button assembly until the surface feature matches a desired orientation, and lock the orientation of the button assembly by engaging an orientation feature to lock the button assembly to the housing.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for assembling an electronic device having a housing, wherein the housing is arranged to enclose and support at least one operational component and includes at least one opening sized to accommodate a mechanical input assembly, the mechanical input assembly used to influence operations of the operational component, the method comprising:
    providing the housing;
    providing the mechanical input assembly, the mechanical input assembly comprising:
        a feature arranged to receive an input event at least a portion of the feature exposed at an outside surface of the housing,
        an operational indicia visible on the exposed portion of the feature and having a preferred orientation with respect to the housing, the operational indicia providing an indication of how the operation of the operational component is influenced, and a shaft having a size and shape in accordance with the opening, the shaft attached to the external feature at a first end and an integrally formed self-capturing feature at a second end;

inserting the self-capturing feature into the opening until the self-capturing feature is activated;

properly aligning the indicia; and locking the orientation of the mechanical input assembly to the housing.

2. The method of claim 1, wherein the integrally formed self-capturing feature includes threads on the shaft.

3. The method of claim 1, wherein the integrally formed self-capturing feature includes an expanding fastener.

4. The method of claim 1, wherein the feature is a round button.

5. A method for installing and aligning a button assembly to a housing, the method comprising:

wherein the button assembly includes at least a button feature attached to a shaft having a self-capturing feature, wherein the button feature has a surface feature;

inserting the shaft of the button assembly into an opening in the housing until the self-capturing feature passes through the entire opening, thus securing the button assembly to the housing;

rotating the button assembly until the surface feature matches a desired orientation; and locking the orientation of the button assembly by engaging an alignment feature to lock the button assembly to the housing.

6. The method of claim 5, wherein the alignment feature comprises a notched portion on the button feature designed to engage a tabbed portion on the housing when the button assembly is rotated to a particular orientation.

7. The method of claim 5, wherein the surface feature is a surface feature which includes a symbol that is identical to a different symbol if the surface feature is rotated to a particular orientation different than the desired orientation.

8. The method of claim 5, wherein the locking is performed automatically when the button assembly is rotated to the desired orientation.

9. A method for installing and aligning a button assembly to a housing, the method comprising:

wherein the button assembly includes at least a button feature attached to a shaft having a threaded portion, wherein the button feature has a surface feature;

engaging the threaded portion of the shaft with a conforming threaded portion of an opening in the housing sized to receive the shaft;

rotating the button assembly until the threaded portion no longer engages the conforming threaded portion of the opening; and locking the orientation of the button assembly by engaging an alignment feature to lock the button assembly to the housing.

10. The method of claim 9, wherein the threads are designed such that as soon as the button assembly is rotated until the threaded portion no longer engages the conforming threaded portion of the opening, the button assembly is at a desired orientation.

11. The method of claim 9, further comprising, after the threaded portion no longer engages the conforming threaded portion of the opening, rotating the button assembly to a desired orientation prior to locking the orientation of the button assembly.

12. The method of claim 9, further comprising inserting a shim between a top portion of the threaded portion of the shaft and an interior portion of the housing to aid in securing the button assembly to the housing.

13. A method for installing and aligning a button assembly to a housing, the method comprising:

wherein the button assembly includes at least a button feature attached to a shaft having an expanding fastener, wherein the button feature has a surface feature;

inserting the shaft of the button assembly into an opening in the housing until the expanding fastener passes through the entire opening, causing the self-capturing feature to alter its shape to expand laterally with respect to the shaft to resist movement of the shaft back out of the opening;

rotating the button assembly until the surface feature matches a desired orientation; and locking the orientation of the button assembly by engaging an alignment feature to lock the button assembly to the housing.

14. The method of claim 13, wherein the expanding fastener comprises two or more prongs, each of the prongs affixed to the shaft using a hinge and movable to between a zero degree and ninety degree angle with respect to the length of the shaft, and wherein each of the prongs is designed to expand to a ninety degree angle with respect to the length of the shaft in the absence of any force in the opposite direction.

15. The method of claim 14, wherein the prongs are attached to springs causing an outward force, thus moving the prongs towards the ninety degree angle with respect to the length of the shaft in the absence of any force compressing the spring.

16. The method of claim 13, wherein the expanding fastener comprises two or more prongs, each of the prongs affixed to the shaft and designed to move outward with respect to the shaft unless an inward force is applied.

17. A computing device comprising:

a housing, the housing arranged with an opening and a first keying feature;

a button assembly including:

a button feature with a surface feature and a second keying feature;

a shaft containing a self-capturing feature designed to secure the button assembly to the housing when the shaft is passed through the entire opening; and wherein the second keying feature is designed to engage the first keying feature to lock the orientation of the button assembly to prevent further rotation, once the button assembly is rotated to a desired orientation.

18. The computing device of claim 17, further comprising a shim located between the self-capturing feature and the housing to aid in securing the button assembly to the housing.

19. The computing device of claim 17, wherein the first keying feature is a tab and the second keying feature is a notch in the button assembly.

20. The computing device of claim 17, wherein the self-capturing feature includes a threaded portion designed to engage a corresponding threaded portion on the housing.

21. The computing device of claim 17, wherein the self-capturing feature includes an expanding fastener designed to automatically expand upon the self-capturing feature emerging from the interior portion of the opening of the housing to secure the button assembly to the housing.

22. The computing device of claim 17, wherein the self-capturing feature includes both a threaded portion designed to engage a corresponding threaded portion on the housing, and an expanding fastener designed to automatically expand upon the self-capturing feature emerging from the interior portion of the opening of the housing, to secure the button assembly to the housing.

23. The computing device of claim 22, wherein the expanding fastener includes two or more prongs attached to the shaft with two or more springs acting to exert an outward force on the two or more prongs.

24. A computer readable medium for storing in non-transitory tangible form computer instructions executable by a processor for installing and aligning a button assembly to a housing, wherein the button assembly includes at least a button feature attached to a shaft having a self-capturing feature, wherein the button feature has a surface feature, the computer readable medium comprising:

computer code for inserting the shaft of the button assembly into an opening in the housing until the self-capturing feature passes through the entire opening, thus securing the button assembly to the housing;

computer code for rotating the button assembly until the surface feature matches a desired orientation; and computer code for locking the orientation of the button assembly by engaging an alignment feature to lock the button assembly to the housing.

25. The computer readable medium of claim 24, wherein the shaft of the button assembly is sized and shaped in accordance with the size and shape of the opening.

\* \* \* \* \*